United States Patent
Lu et al.

(10) Patent No.: US 10,175,462 B2
(45) Date of Patent: Jan. 8, 2019

(54) WAFER LEVEL LENS SYSTEM AND METHOD OF FABRICATING THE SAME

(71) Applicant: HIMAX TECHNOLOGIES LIMITED, Tainan (TW)

(72) Inventors: Yin-Dong Lu, Tainan (TW); Han-Ching Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 41 days.

(21) Appl. No.: 14/807,454

(22) Filed: Jul. 23, 2015

(65) Prior Publication Data

US 2017/0023776 A1    Jan. 26, 2017

(51) Int. Cl.
| | |
|---|---|
| G02B 13/18 | (2006.01) |
| G02B 3/02 | (2006.01) |
| G02B 13/00 | (2006.01) |
| G02B 7/02 | (2006.01) |
| B29D 11/00 | (2006.01) |

(52) U.S. Cl.
CPC ...... *G02B 13/0085* (2013.01); *B29D 11/0073* (2013.01); *B29D 11/00307* (2013.01); *B29D 11/00355* (2013.01); *G02B 7/022* (2013.01); *G02B 13/004* (2013.01); *G02B 13/006* (2013.01); *G02B 13/0035* (2013.01)

(58) Field of Classification Search
CPC ............ G02B 13/0085; G02B 13/0035; G02B 7/022; G02B 1/041; G02B 13/004; G02B 13/006; B29D 11/00355; B29D 11/0073; B29D 11/00307
See application file for complete search history.

(56) References Cited

U.S. PATENT DOCUMENTS

| | | | |
|---|---|---|---|
| 2005/0030647 A1* | 2/2005 | Amanai | G02B 13/009 359/798 |
| 2010/0128350 A1 | 5/2010 | Findlay et al. | |
| 2011/0037887 A1* | 2/2011 | Lee | G02B 13/0035 348/340 |
| 2012/0188635 A1* | 7/2012 | Kubala | G02B 7/003 359/356 |
| 2014/0268372 A1* | 9/2014 | Lu | G02B 13/0085 359/796 |
| 2015/0333094 A1* | 11/2015 | Wan | G02B 7/02 250/208.1 |

FOREIGN PATENT DOCUMENTS

WO    2011055655 A1    5/2011

* cited by examiner

*Primary Examiner* — Alicia M Harrington
(74) *Attorney, Agent, or Firm* — Locke Lord LLP; Tim Tingkang Xia, Esq.

(57) ABSTRACT

A wafer level lens system includes a target lens and a wafer level lens group. The target lens includes a first surface, a second surface, and a first fitting structure. The second surface is opposite to the first surface. The first fitting structure is disposed at the second surface. The wafer level lens group includes a first transparent plate and a second fitting structure. The first transparent plate has a third surface and a fourth surface opposite to the third surface. The second fitting structure is disposed on the third surface. The first fitting structure is fitted into the second fitting structure, and there is a space encapsulated between the second surface and the third surface.

18 Claims, 5 Drawing Sheets

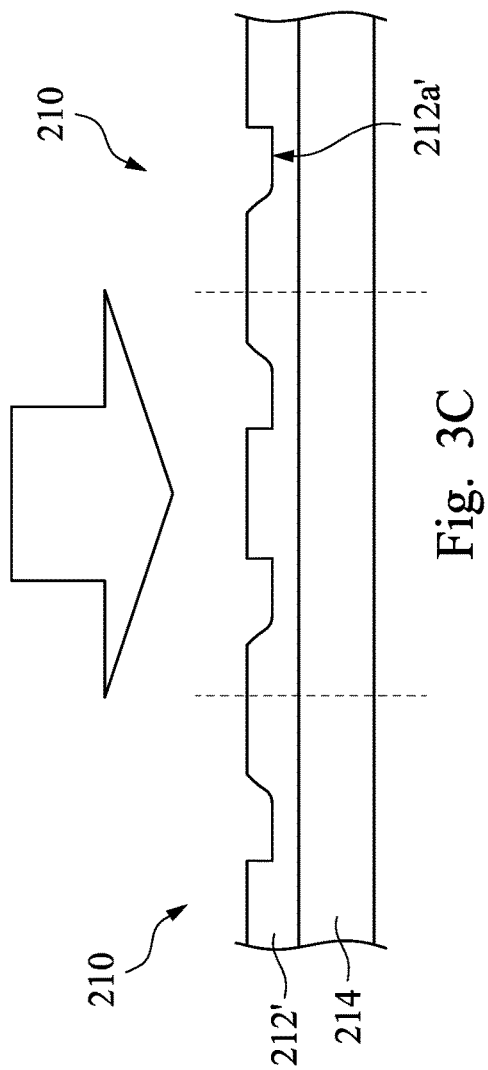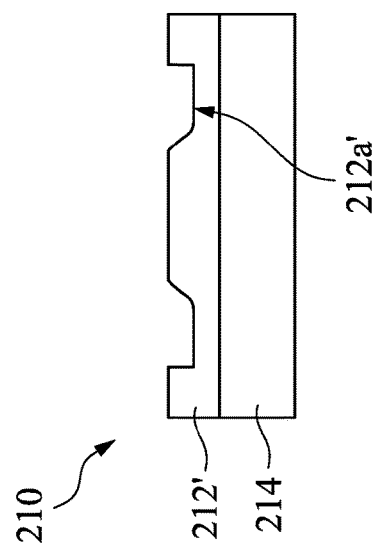

WAFER LEVEL LENS SYSTEM AND METHOD OF FABRICATING THE SAME

BACKGROUND

Field of Invention

The present invention relates to a lens system, and more particularly to a wafer level lens system.

Description of Related Art

With the trends of microminiaturization and cost reduction of electronic products, the wafer level module (WLM) technology has drawn the attention. The WLM technology mainly applies the wafer level manufacturing technology to electronic products, so as to microminiaturize the electronic products. For example, applying the WLM technology to the manufacture of lenses renders the size of the lenses so manufactured significantly smaller than the size of the conventional lenses. Therefore, the manufactured lenses are further applicable to the camera modules in electronic devices such as laptops, tablets, and cell phones.

A conventional wafer level lens is manufactured by bonding two lenses together. In the manufacture process of the wafer level lens, the optical axes of the two lenses need to be precisely aligned to ensure the optical quality of the wafer level lens. However, aligning the optical axes of the two lenses in wafer level is a challenge in the manufacture process.

SUMMARY

One embodiment of the present invention provides a wafer level lens system having plural optical elements. The optical elements are formed to include fitting structures, which are fitted structurally to precisely align the optical elements for ensuring the optical quality of the wafer level lens system.

According to one embodiment of the present invention, a wafer level lens system includes a target lens and a wafer level lens group. The target lens includes a first surface, a second surface, and a first fitting structure. The second surface is opposite to the first surface. The first fitting structure is disposed at least at the second surface. The wafer level lens group includes a first transparent plate and a second fitting structure. The first transparent plate has a third surface and a fourth surface opposite to the third surface. The second fitting structure is disposed on the third surface. The first fitting structure is fitted into the second fitting structure, and there is a space encapsulated between the second surface and the third surface.

According to one embodiment of the present invention, a method for fabricating a wafer level lens system includes disposing an imprintable material on a first surface of a transparent plate; producing an imprint in the imprintable material to form a first fitting structure; hardening the imprintable material to form at least one first wafer level lens group comprising the transparent plate and the first fitting structure; and bonding the first wafer level lens group with a target lens, in which the target lens comprises a second fitting structure, and the second fitting structure is fitted into the first fitting structure.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 3A to FIG. 3E are schematic diagrams of a method for fabricating a wafer level lens system according to another embodiment of the invention.

DETAILED DESCRIPTION

Figure 2:
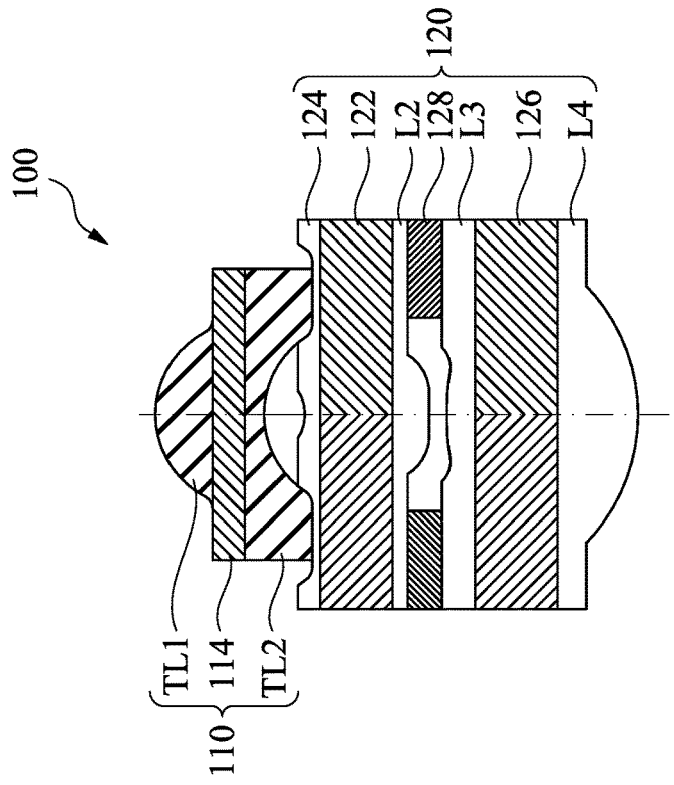
FIG. 2 is a schematic structural diagram of a wafer level lens system according to another embodiment of the invention.

Reference will now be made in detail to the present embodiments of the invention, examples of which are illustrated in the accompanying drawings. Wherever possible, the same reference numbers are used in the drawings and the description to refer to the same or like parts.

Herein, the term "wafer level" lens system may refer to the descriptive size of certain lens systems in accordance. However, it is appreciated that the embodiments of the present invention are not necessarily so limited, and that certain aspects of the embodiments may be applicable to larger, and possibly small size scales.

Figure 1:
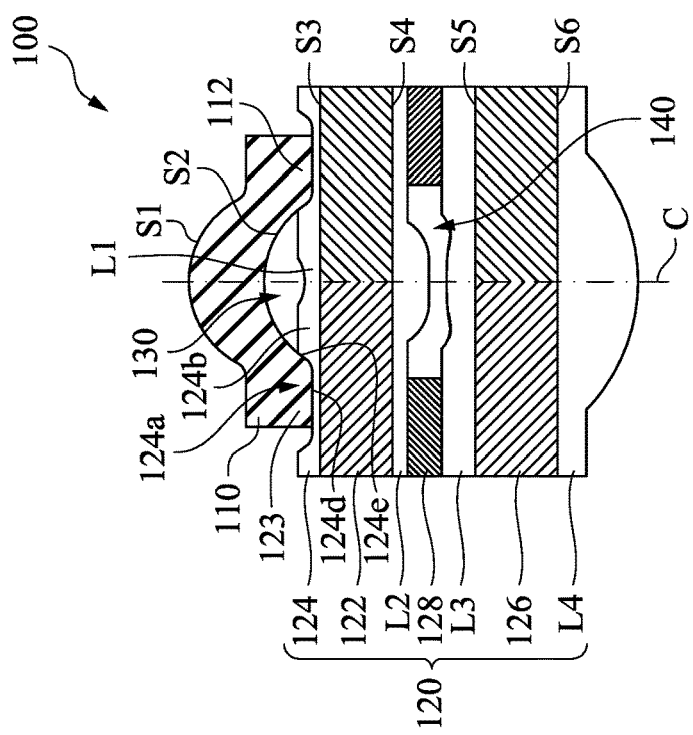
FIG. 1 is a schematic structural diagram of a wafer level lens system according to an embodiment of the invention.

FIG. 1 is a schematic structural diagram of a wafer level lens system 100 according to an embodiment of the invention. The wafer level lens system 100 includes a target lens 110 and a wafer level lens group 120. The target lens 110 includes a first surface S1, a second surface S2, and a first fitting structure 112. The second surface S2 is opposite to the first surface S1. The first fitting structure 112 is disposed at least at the second surface S2. The wafer level lens group 120 includes a first transparent plate 122 and a second fitting structure 124. The first transparent plate 122 has a third surface S3 and a fourth surface S4 opposite to the third surface S3. The second fitting structure 124 is disposed on the third surface S3. The first fitting structure 112 is fitted into the second fitting structure 124, and there is a space 130 encapsulated between the second surface S2 and the third surface S3.

In one or more embodiments, the first surface S1 includes a convex aspheric surface, and the second surface S2 includes a concave aspheric surface. In this embodiment, the target lens 110 can be a convex lens for collecting light, but it should not limit the scope of the present invention. In some embodiments, the target lens 110 can be a concave lens. The first transparent plate 122 can be a flat plate, and that is, the third surface S3 and the fourth surface S4 are plane surfaces.

In one or more embodiments, the wafer level lens system 100 includes an optical axis C, which is the straight line that passes through the centers of curvatures of the lens surfaces, such as the first surface S1, the second surface S2, etc. The first fitting structure 112 and the second fitting structure 124 are engaged at a position off the optical axis C, and the space 130 is left on the optical axis C. As a result, when light passes through the center of the wafer level lens system 100, the first fitting structure 112 and the second fitting structure 124 have little influence on the light traces, and the space 130 has a great influence on the light traces.

In one embodiment, the first fitting structure 112 includes a flange 123 surrounding the concave aspheric surface of the second surface S2. The second fitting structure 124 includes a recess 124a, a flat portion 124b surrounded by the recess 124a, and a first lens structure L1 surrounded by the flat portion 124b. The first lens structure L1 is disposed on the optical axis C. Though the first lens structure L1 is a concave lens herein, it should not limit the scope of the present invention, and the first lens structure L1 can be a convex lens. In some embodiments, the first lens structure L1 is integrally formed with the flat portion 124b of the second fitting structure 124. In some embodiments, the configuration of the first lens structure L1 can be omitted, and the second fitting structure 124 includes the recess 124a and the flat portion 124b. Herein, the configurations of the recess 124a, the flat portion 124b, and the first lens structure L1 are concentric herein, but it should not limit the scope of the present invention. In some embodiments, the configurations of the recess 124a, the flat portion 124b, and the first lens structure L1 can be asymmetric.

On one hand, the flange 123 is fitted into the recess 124a, in which a bottom surface 124d of the recess 124a is in contact with the flange 123. On the other hand, the flat portion 124b is fitted into the concave aspheric surface of the second surface S2, in which a sidewall 124e of the recess 124a is in contact with the concave aspheric surface of the second surface S2.

Traditionally, it is difficult to align the wafer level optical elements with each other well due to the miniaturization requirement. In the embodiments of the present invention, the second fitting structure 124 can be formed by methods, such as the printing process. In this way, the first fitting structure 112 and the second fitting structure 124 can be engaged, thereby ensuring the optical axes of the target lens 110 and the wafer level lens group 120 are aligned well. As a result, with the aforementioned configuration, the relative position of the target lens 110 and the wafer level lens group 120 is secured by the engagement, and therefore the optical axes of the target lens 110 and the wafer level lens group 120 are aligned well as the optical axis C.

Furthermore, with the aforementioned configuration, the space 130 is disposed between the concave aspheric surface of the second surface S2 and the combination the flat portion 124b and the first lens structure L1. The space 130 is filled with air. Therefore, the light passing through the target lens 110 can be refracted greatly at the second surface S2 since the concave aspheric surface of the second surface S2 is an interface between different materials, such as glass and air, having a refractive difference.

Though details of the complementary configuration are depicted in the drawing, it is noted that the first fitting structure 112 and the second fitting structure 124 can be various structures, and the structures depicted in the drawing should not limit the scope of the present invention.

In one or more embodiments, the wafer level lens group 120 includes the first lens structure L1 that is the concave optical lens of the second fitting structure 124, and a second lens structure L2 disposed on the fourth surface S4. In this embodiment, the second lens structure L2 can includes a convex lens on the optical axis C.

In one or more embodiments, the wafer level lens group 120 can include a second transparent plate 126, a third lens structure L3, a fourth lens structure L4, and a spacer 128. The second transparent plate 126 has a fifth surface S5 and a sixth surface S6 opposite to the fifth surface S5. The second transparent plate 126 is disposed on a side of the first transparent plate 122 opposed to the target lens 110. The third lens structure L3 is disposed on the fifth surface S5, and the fourth lens structures L4 is disposed on the sixth surface S6. The spacer 128 is disposed between an edge of the fourth surface S4 and an edge of the fifth surface S5 to form a lens group space 140 therebetween. To be specific, the spacer 128 is disposed between an edge of the second lens structure L2 and an edge of the third lens structure L3. The lens group space 140 is filled with air.

As previous description, since there is a great difference between the refractive indexes of air and lens material, light entering the wafer level lens system 100 can be refracted greatly at the interface between the second lens structure L2 and the lens group space 140 and the interface between the lens group space 140 and the third lens structure L3.

In addition to the design of the lens group space 140, the configurations of the first lens structure L1, the second lens structure L2, the third lens structure L3, and the fourth lens structure L4 have aspheric curvatures, and therefore enhance the ability of light collecting of the wafer level lens system 100.

In one or more embodiments, the focal length and the thickness of the target lens 110 are designed to accommodate the need of miniaturization and light collecting.

In this embodiment, the target lens 110 can be fabricated by a molding process. The material of the target lens 110 fabricated by the molding process can be reflowable. However, the method of fabricating the target lens 110 should not be limited thereto. The embodiment of FIG. 2 shows the target lens 110 fabricated by a printing process.

FIG. 2 is a schematic structural diagram of a wafer level lens system 100 according to another embodiment of the invention. In this embodiment, the target lens 110 can be fabricated by a printing process. The target lens 110 can include a target substrate 114, a first target lens structure TL1, and a second target lens structure TL2. Herein, the first target lens structure TL1 and the second target lens structure TL2 are disposed on two opposite sides of the target substrate 114. The first target lens structure TL1 and the second target lens structure TL2 offer a focus power for the target lens 110.

In this embodiment, the first target lens structure TL1 and the second target lens structure TL2 can be made of imprintable materials.

Reference is made to FIG. 1 and FIG. 2. In one or more embodiments, the wafer level lens group 120 can be fabricated through the imprinting process. The second fitting structure 124, the second lens structure L2, the third lens structures L3, the fourth lens structure L4, the first target lens structure TL1, or the second target lens structure TL2 can be made of imprintable materials. The first transparent plate 122 and the second transparent plate 126 can be made of glass or acrylic.

Furthermore, in the embodiment of FIG. 1, the target lens 110 and the wafer level lens group 120 can be fabricated by different processes and then assembled to form the wafer level lens system 100. The engagement of the second fitting structure 124 and the second lens structure L2 are designed to help the alignment and enhances the accuracy in the assembly.

In the embodiment of FIG. 2, the target lens 110 and the wafer level lens group 120 can be fabricated by the same process. It is noted that the fabrication process of the target lens 110 does not limit the scope of the present invention.

FIG. 3A to FIG. 3E are schematic diagrams of a method for fabricating a wafer level lens system 200 according to another embodiment of the invention. Herein, plural steps are introduced to illustrate the process for fabricating a wafer level lens system 200, and it is noted that some steps may be omitted without departing the scope of the present invention.

Figure 3A:
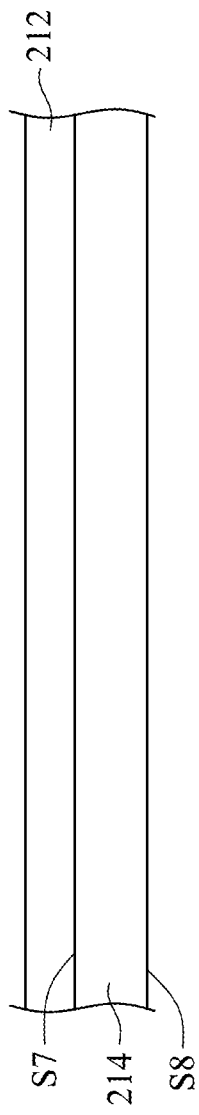

Referring to FIG. 3A, a transparent plate 214 includes a first surface S7 and a second surface S8 opposite to the first surface S7. An imprintable material 212 is disposed on a first surface S7. The imprintable material 212 can be silicon gel, acrylic gel, resin, etc. The imprintable material 212 is deformable, capable of being shaped by a force exerted thereon, and capable of being hardened.

Figure 3B:
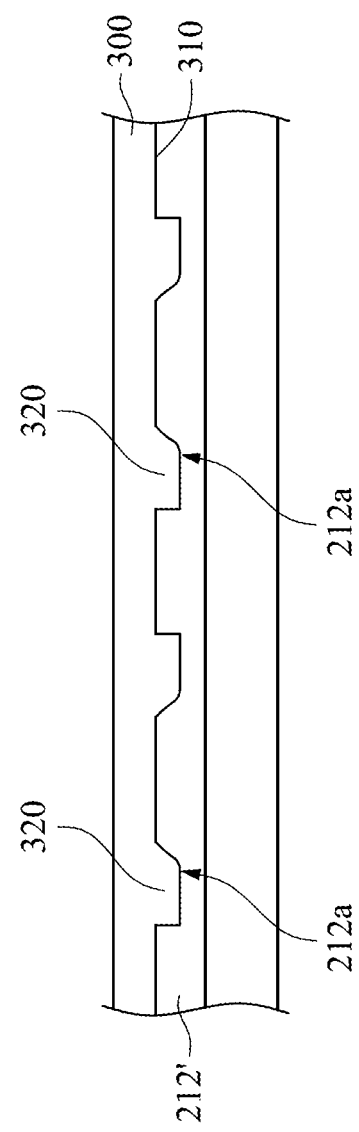

Referring to FIG. 3B, a surface 310 of a master 300 is applied to the imprintable material 212 (referring to FIG. 3A). The master 300 has a determined structure to produce an imprint in the imprintable material 212 (referring to FIG. 3A), and therefore an uncured first fitting structure 212' is formed. Herein, the master 300 has plural protrusions 320 as the determined structure, and therefore plural recesses 212a are imprinted in the imprintable material 212 (referring to FIG. 3A).

It is noted that, FIG. 3A to FIG. 3E are cross-section views. In fact, the protrusions 320 have a shape of ring, and the recesses 212a have also a shape of ring. There are two recesses 212a and two protrusions 320 shown in the figure, but the configuration of the structure or number of the recesses 212a and the protrusions 320 should not limit the scope of the present invention.

Referring to FIG. 3C, the master 300 (referring to FIG. 3B) is removed, and then the uncured first fitting structure 212' is exposed to a light, such as UV-light. Then, the uncured first fitting structure 212' can be cured and hardened to form plural first wafer level lens groups 210 including the transparent plate 214 and the first fitting structure 212' with a recess 212a'. Herein, a first wafer level lens group 210 is configured to include one transparent plate 214 and one first fitting structure 212'. The plural first wafer level lens groups 210 are formed integrally and connected herein. Though only two first wafer level lens groups 210 are depicted herein, it is noted that the number of the first wafer level lens groups 210 is not limited thereto.

Referring to FIG. 3D, the first wafer level lens groups 210 are separated from each other by laser cutting, mechanical cutting, etc. along the dash line shown in FIG. 3C. Therefore, the first wafer level lens groups 210 are disconnected to each other.

Figure 3E:
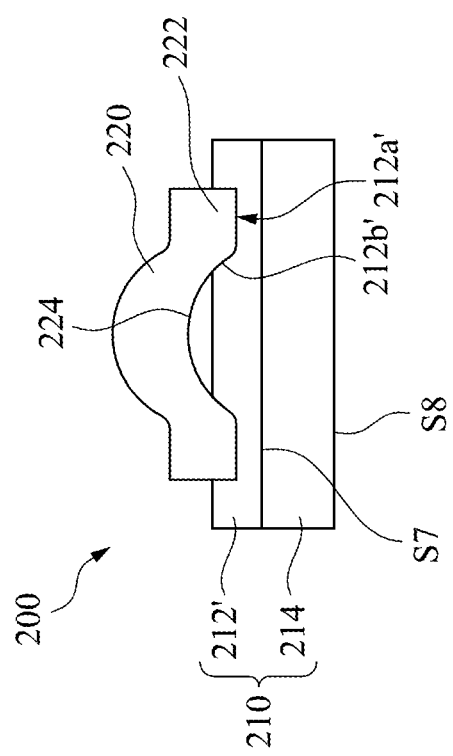

Referring to FIG. 3E, one of the first wafer level lens groups 210 is bonded with a target lens 220, in which the target lens 220 includes a second fitting structure 222, and the second fitting structure 222 is fitted into the first fitting structure 212'. To be specific, the bonding process is performed by attaching a sidewall 212b' of the recess 212a' to a concave aspheric surface 224 of the target lens 220. Then, a wafer level lens system 200 is formed.

In addition, a lens structure (not shown) can be formed on the second surface S8 through the similar steps illustrated in FIG. 3A-3D, and the fabrication method are not repeated herein. The configuration of other lens structures does not limit the scope of the present invention.

Furthermore, the target lens 220 can be formed by various methods, such as imprinting, molding, etc. The imprinting process of the target lens 220 is similar to the steps illustrated in FIG. 3A to FIG. 3D, and therefore are not repeated herein. The molding process is introduced in FIG. 4A to FIG. 4C.

Figure 4B:
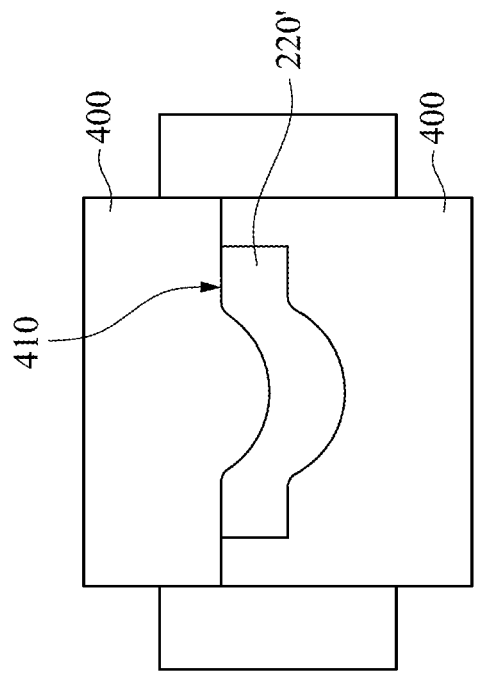
FIG. 4A to FIG. 4C are schematic diagrams of a method for fabricating the target lens in FIG. 3A to FIG. 3E.
Figure 4A:
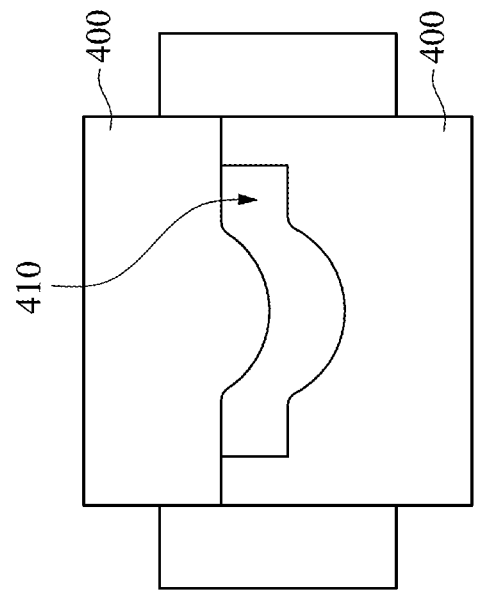
Figure 4C:
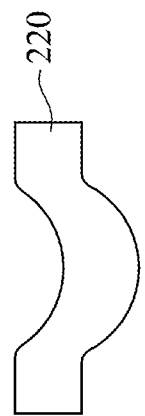

FIG. 4A to FIG. 4C are schematic diagrams of a method for fabricating the target lens 220 in FIG. 3E. Referring to FIG. 4A, two molds 400 forms a mold cavity 410 having dimensions substantially the same as the target lens 220 (referring to FIG. 3E). It is noted that the number of the molds 400 should not limit the scope of the present invention. The mold cavity 410 can be formed by more than the two molds 400.

Referring to FIG. 4B, a lens-forming fluid 220' is injected into the mold cavity 410. The lens-forming fluid 220' can be reflowable.

Then, the lens-forming fluid 220' within the mold cavity 410 can be heated. The heating process hardens the lens-forming fluid 220' to form the target lens 220 (referring to FIG. 3E). It is noted that the method of hardening the lens-forming fluid 220' is not limited to the heating process. According to the materials of the target lens 220 (referring to FIG. 3E), some other hardening methods can be performed. Referring to FIG. 4C, by separating the molds 400, the target lens 220 is obtained.

The target lens 220 fabricated through the molding process may be thinner than the target lens 220 fabricated through the imprinting process, while the focal length remains the same.

One embodiment of the present invention provides a wafer level lens system having plural optical elements. The optical elements are formed to include fitting structures, which are fitted structurally to precisely align the optical elements for ensuring the optical quality of the wafer level lens system.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wafer level lens system, comprising:
   a monolithic lens having a first surface and a second surface opposite to the first surface, wherein each of the first surface and the second surface comprises a curved surface, and the monolithic lens is a single piece of continuous material and comprises:
   a first fitting structure disposed at least at the second surface; and
   a composite wafer level lens group comprising:
   a first transparent plate having a third surface and a fourth surface opposite to the third surface, wherein the third surface and the fourth surface are planar; and
   a second fitting structure, which is a material layer covering the entire third surface of the first transparent plate, wherein the first fitting structure is fitted into the second fitting structure, such that the monolithic lens and the composite wafer level lens group are fixed to each other, and there is a space encapsulated between the second surface and the third surface.

2. The wafer level lens system of claim 1, wherein the first surface comprises a convex aspheric surface, and the second surface comprises a concave aspheric surface.

3. The wafer level lens system of claim 2, wherein the first fitting structure comprises a flange surrounding the concave aspheric surface, the second fitting structure comprises a recess, and the flange is fitted into the recess.

4. The wafer level lens system of claim 3, wherein a sidewall of the recess is in contact with the concave aspheric surface of the second surface.

5. The wafer level lens system of claim 3, wherein the second fitting structure comprises a flat portion surrounded by the recess, and the flat portion is fitted into the concave aspheric surface.

6. The wafer level lens system of claim 5, wherein the space is disposed between a concave aspheric surface of the second surface and the flat portion.

7. The wafer level lens system of claim 5, wherein the second fitting structure comprises a first lens structure surrounded by the flat portion.

8. The wafer level lens system of claim 1, wherein the monolithic lens is made of a reflowable material.

9. The wafer level lens system of claim 1, wherein the composite wafer level lens group comprises a second lens structure disposed on the fourth surface.

10. The wafer level lens system of claim 1, wherein the composite wafer level lens group comprises:
a second transparent plate having a fifth surface and a sixth surface opposite to the fifth surface, wherein the second transparent plate is disposed on a side of the first transparent plate opposite to the monolithic lens; and
a spacer disposed between an edge of the fourth surface and an edge of the fifth surface to form a lens group space therebetween.

11. The wafer level lens system of claim 10, wherein the composite wafer level lens group comprises a third lens structure and a fourth lens structure, the third lens structure is disposed on the fifth surface, and the fourth lens structure is disposed on the sixth surface.

12. The wafer level lens system of claim 1, wherein the space is filled with air.

13. A method for fabricating a wafer level lens system, comprising:
disposing an imprintable material layer on a first surface of a transparent plate, wherein the first surface of the transparent plate is planar;
producing an imprint in the imprintable material layer to form a first fitting structure on the first surface of the transparent plate and covering the entire first surface of the transparent plate;
hardening the first fitting structure to form at least one first composite wafer level lens group comprising the transparent plate and the first fitting structure; and
fitting a second fitting structure of a monolithic lens into the first fitting structure such that the monolithic lens and the first composite wafer level lens group are fixed to each other, wherein the monolithic lens is a single piece of continuous material and has a first surface and a second surface opposite to the first surface, wherein each of the first surface and the second surface comprises a curved surface.

14. The method of claim 13, wherein the imprinting process is performed by applying a surface of a master to the imprintable material layer.

15. The method of claim 13, wherein the number of the first composite wafer level lens group is plural, and the method further comprising:
separating the first composite wafer level lens groups.

16. The method of claim 13, wherein the first fitting structure comprises a recess, and the bonding process is performed by attaching a sidewall of the recess to a concave aspheric surface of the monolithic lens.

17. The method of claim 13, wherein the monolithic lens is formed by a molding process comprising:
forming a mold cavity having dimensions substantially the same as the monolithic lens between at least two molds;
injecting a lens-forming fluid into the mold cavity;
hardening the lens-forming fluid within the mold cavity to form the monolithic lens; and
separating the monolithic lens from the molds.

18. The method of claim 13, wherein the monolithic lens is formed by an imprinting process.

* * * * *